United States Patent
Dover

(10) Patent No.: US 7,076,627 B2
(45) Date of Patent: Jul. 11, 2006

(54) MEMORY CONTROL FOR MULTIPLE READ REQUESTS

(75) Inventor: Lance W. Dover, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 09/895,928

(22) Filed: Jun. 29, 2001

(65) Prior Publication Data

US 2003/0005242 A1 Jan. 2, 2003

(51) Int. Cl.
G06F 13/18 (2006.01)

(52) U.S. Cl. .................. 711/169; 711/150; 711/151

(58) Field of Classification Search ............... 711/140, 711/149, 150, 151, 168, 169; 710/244
See application file for complete search history.

(56) References Cited

U.S. PATENT DOCUMENTS

| | | | |
|---|---|---|---|
| 3,931,613 A | 1/1976 | Gruner et al. | |
| 5,202,973 A | 4/1993 | Ramanujan et al. | |
| 6,091,618 A | 7/2000 | Fazio et al. | |
| 6,212,611 B1 * | 4/2001 | Nizar et al. | 711/169 |
| 6,266,750 B1 * | 7/2001 | DeMone et al. | 711/169 |
| 6,564,284 B1 * | 5/2003 | Christenson | 711/5 |
| 6,697,907 B1 * | 2/2004 | Roohparvar | 711/103 |

FOREIGN PATENT DOCUMENTS

| | | |
|---|---|---|
| GB | 2 035 632 A | 6/1980 |
| WO | WO 95/24678 | 9/1995 |
| WO | PCT US02/20642 | 10/2002 |

OTHER PUBLICATIONS

3 Volt Fast Boot Block Flash Memory 28F800F3 and 28F160F3, Intel® Corporation, Order No. 290644-005, pp. i-v and 1-46 (Jan. 2000).

3 Volt Fast Boot Block Flash Memory 28F800F3, 28F160F3 (x16) Specification Update, Intel® Corporation, Order No. 297939-005, pp. i-iii and 1-14 (Feb. 2000).

3 Volt Fast Boot Block Design Guide, Application Note 655, Intel® Corporation, Order No. 292213-003, pp. i-iv and 1-12 (Feb. 2000).

Intel® Flash Data Integrator (FDI) User's Guide, Version 3.0, Intel® Corporation, Order No. 297833-006, pp. i-ix, 1-1 to 1-5, 2-1 to 2-5, 3-1 to 3-12, 4-1 to 4-12, 5-1 to 5-12, 6-1 to 6-24, 7-1 to 7-44, 8-1 to 8-10, 9-1 to 9-13, 10-1 to 10-10, 11-1 to 11-4, 12-1 to 12-5, 13-1 to 13-3, A-1 to A-16, B-1 to B-2, C-1 to C-3 (Aug. 2000).

U.S. Appl. No. 09/895,982, filed Jun. 29, 2001, entitled Virtual-Port Memory and Virtual-Porting, by Lance W. Dover, 33 pages including first page of filing receipt, application cover sheet, 25 pages specification, and 6 pages drawings.

* cited by examiner

Primary Examiner—Gary Portka
(74) Attorney, Agent, or Firm—Blakely, Sokoloff, Taylor & Zafman LLP

(57) ABSTRACT

Multiple read requests are prioritized. A first one of the prioritized read requests is issued to a memory device. Bits from the memory device are received for the first read request. After issuing the first read request, a second one of the prioritized read requests is issued to the memory device prior to or while receiving bits from the memory device for the first read request.

28 Claims, 4 Drawing Sheets

MEMORY CONTROL FOR MULTIPLE READ REQUESTS

BACKGROUND OF THE INVENTION

1. Field of the Invention

The present invention relates generally to the field of computer systems. More particularly, the present invention relates to the field of memory control for computer systems.

2. Description of Related Art

Synchronous flash memory devices have been designed to respond to an external read request from a processor, for example, with a data burst. When the flash memory device receives the read request, the flash memory device senses a portion of a flash memory containing the requested data. Following this initial lookup latency time, the flash memory device outputs not only the requested data but also any additionally sensed data in anticipation the processor may request this other data in the future. This data burst continues each clock cycle until all of the sensed data has been output to the processor. The flash memory device may then accept another read request.

By sensing more data than was requested, that is by sensing wide, the flash memory device more fully uses available bus bandwidth and provides a prediction mechanism to help reduce latency for future read requests. As one example, a processor may request a single data word 16 bits in length. If the requested data word is not stored in a cache memory for the processor, the processor will issue a read request for the data word from the flash memory device. The flash memory device may then sense four consecutive data words, one of which is the requested data word, and output all four data words, sixteen bits at a time over four clock cycles for example, to the processor. The processor may then store all four data words in its cache memory. If the processor later requests any one of the three non-requested data words, the processor can obtain the requested data from its cache memory without incurring another lookup by the flash memory device.

If the non-requested data is not later requested or used, however, the flash memory device has wasted energy in sensing and outputting the additional data. Also, the flash memory device may have unnecessarily delayed the performance of other read requests due to the additional time required to output the non-requested data.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for memory control for multiple read requests. In the following description, details are set forth such as an exemplary timing diagram, data sizes, computer systems, etc. in order to provide a thorough understanding of the present invention. It will be evident, however, that the present invention may be practiced without these details. In other instances, well-known computer components, etc. have not been described in particular detail so as not to obscure the present invention.

Figure 1:
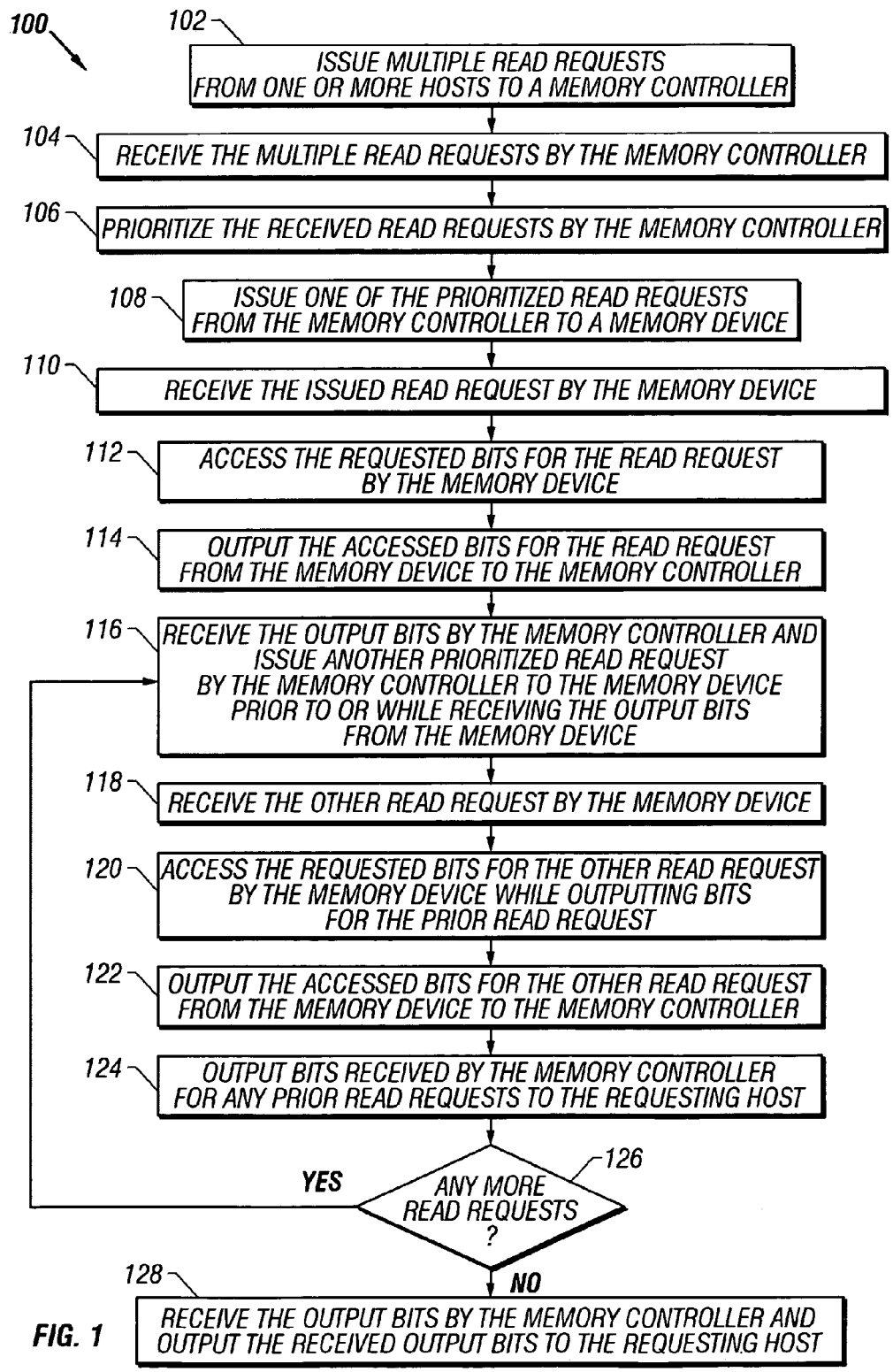
FIG. 1 illustrates, for one embodiment, a flow diagram for memory control for multiple read requests.

FIG. 1 illustrates, for one embodiment, a flow diagram 100 for memory control for multiple read requests. Any suitable computer system may be used to perform memory control for multiple read requests in accordance with flow diagram 100.

Exemplary Computer System

Figure 2:
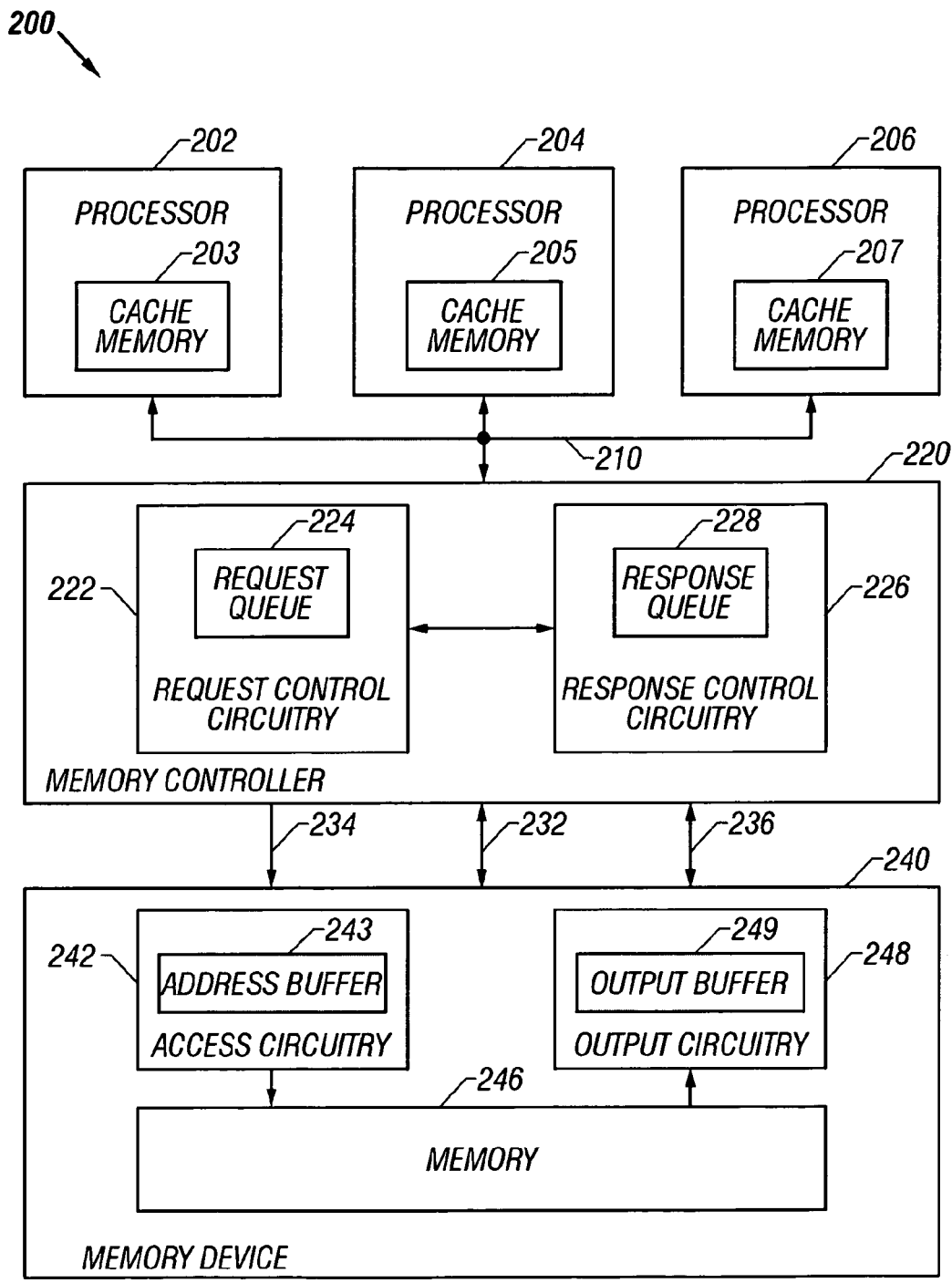
FIG. 2 illustrates an exemplary computer system having a memory controller to control the performance of multiple read requests by a memory device for multiple hosts.

FIG. 2 illustrates one exemplary computer system 200 to perform memory control for multiple read requests in accordance with flow diagram 100 FIG. 1.

Computer system 200 for one embodiment comprises a plurality of processors 202, 204, and 206, a memory controller 220, and a memory device 240.

Each processor 202, 204, and 206 for one embodiment comprises a cache memory 203, 205, and 207, respectively, to store program code and/or data, for example, that has been or may be used by processor 202, 204, and 206, respectively. Although illustrated as having their own respective cache memory 203, 205, and 207 on-chip, each processor 202, 204, and 206 may have one or more corresponding cache memories each of which may be on-chip or externally coupled to its corresponding processor 202, 204, or 206. One or more such cache memories may be optionally shared by more than one processor 202, 204, or 206 and therefore have more than one corresponding processor 202, 204, or 206. Computer system 200 for other embodiments may comprise one, two, or four or more processors.

Each processor 202, 204, and 206 is coupled to memory controller 220 by a processor bus 210. Processor bus 210 may have any suitable number of bus lines. For other embodiments, each processor 202, 204, and 206 may be coupled to memory controller 220 by a separate, respective bus.

As illustrated in FIG. 2, memory controller 220 for one embodiment comprises request control circuitry 222 and response control circuitry 226. Request control circuitry 222 comprises a request queue 224, and response control circuitry 226 comprises a response queue 228. Request control circuitry 222, request queue 224, response control circuitry 226, and response queue 228 may each comprise any suitable circuitry.

Memory controller 220 is coupled to memory device 240 by a control bus 232, an address bus 234, and a data bus 236. Control bus 232, address bus 234, and data bus 236 may each comprise any suitable number of bus lines.

As illustrated in FIG. 2, memory device 240 for one embodiment comprises access circuitry 242, a memory 246, and output circuitry 248. Access circuitry 242 and output circuitry 248 are each coupled to memory 246. Access circuitry 242, memory 246, and output circuitry 248 may each comprise any suitable circuitry. Access circuitry 242 for one embodiment comprises an address buffer 243. Output circuitry 248 for one embodiment comprises an output buffer 249. Memory 246 may comprise any suitable type of memory of any suitable size to store any suitable program code and/or data, for example, for processors 202, 204, and/or 206. Memory 246 may be used, for example, to store any suitable firmware, such as operating system software for example, for execution by processors 202, 204, and/or 206. For one embodiment, memory 246 comprises flash memory. For other embodiments, memory 246 may comprise read only memory (ROM), static random access memory (SRAM), or pseudostatic random access memory (PSRAM), for example.

Memory controller 220 and memory device 240 for one embodiment are each fabricated on separate chips. Memory controller 220 for another embodiment is integrated with memory device 240 on the same chip. For one embodiment where computer system 200 comprises only one processor, such as processor 202 for example, memory controller 220 may be integrated with processor 202 on the same chip. Memory device 240 may then either be integrated with processor 202 and memory controller 220 or be fabricated on a separate chip.

Computer system 200 for other embodiments may comprise any other suitable combination of any suitable components.

Memory Control for Multiple Read Requests

For block 102 of FIG. 1, processors 202, 204, and/or 206 issue one or more read requests to memory controller 220 to request program code and/or data, for example, from memory device 240. For one embodiment, one or more read requests are each a cache line fill request for processor 202, 204, or 206 to obtain program code and/or data, for example, that is not presently stored in cache memory 203, 205, or 207, respectively. Processors 202, 204, and/or 206 for one embodiment may each have prefetching and/or branch prediction capability and therefore issue multiple read requests to request program code, for example, that the requesting processor 202, 204, or 206 anticipates it will use. Processors 202, 204, and/or 206 may issue read requests to memory controller 220 in any suitable order and in accordance with any suitable communications protocol.

Each read request may have any suitable format. Each read request for one embodiment specifies a virtual or real address at which the requested program code and/or data is to be read from memory device 240. Each read request for one embodiment may also identify the processor 202, 204, or 206 originating the read request.

For block 104, memory controller 220 receives the multiple read requests. For one embodiment, request control circuitry 222 receives each read request. Although illustrated as receiving multiple read requests from processor 202, 204, and/or 206, memory controller 220 may be coupled to receive multiple read requests from any suitable one or more hosts. As one example, memory controller 220 for one embodiment may be coupled to one or more binding or interfacing units that have a prediction mechanism to prefetch program code, for example.

For block 106, memory controller 220 prioritizes the received read requests in an order for issuance to memory device 240. For one embodiment, request control circuitry 222 prioritizes received read requests and stores them in request queue 224 in prioritized order. Request control circuitry 222 may prioritize each received read request in accordance with any suitable prioritization scheme. Request control circuitry 222 may, for example, prioritize each received read request based on which processor 202, 204, or 206 issued the read request. For one embodiment, request control circuitry 222 may reprioritize read requests stored in request queue 224 when request control circuitry 222 receives any new read requests.

For block 108, memory controller 220 issues one of the prioritized read requests to memory device 240. Memory controller 220 may issue each prioritized read request to memory device 240 in accordance with any suitable communications protocol. For one embodiment, request control circuitry 222 issues each prioritized read request in request queue 224 to memory device 240. For one embodiment, request control circuitry 222 issues each read request by issuing one or more control signals over control bus 232 and by issuing address signals for the read request over address bus 234. Request control circuitry 222 for one embodiment may issue a REQUEST signal over control bus 232 to issue each read request to memory device 240.

For one embodiment where read requests are issued by processor 202, 204, or 206 with a virtual address, request control circuitry 222 of memory controller 220 may convert any virtual address to a real address prior to or in issuing each prioritized read request to memory device 240.

For block 110, memory device 240 receives the issued read request. For one embodiment, access circuitry 242 receives each issued read request and stores the address for the read request in address buffer 243.

Address buffer 243 may have any suitable size. Address buffer 243 for one embodiment is sized to store only one address. For another embodiment, address buffer 243 is sized to store more than one address.

For block 112, memory device 240 accesses the bits of the program code and/or data requested by the received read request. For one embodiment, access circuitry 242 accesses in memory 246 the requested bits at the address stored in address buffer 243 for the received read request. For one embodiment where memory 246 comprises flash memory, for example, access circuitry 242 senses the requested bits to access them.

Memory device 240 for one embodiment accesses a predetermined number of bits in memory 246 at the address stored in address buffer 243 for the received read request. For one embodiment, the predetermined number of bits is equal in number to that for a cache line in cache memory 203, 205, and 207. For one embodiment, a cache line is 256 bits in size.

For block 114, memory device 240 outputs the accessed bits for the received read request to memory controller 220. Memory device 240 may output accessed bits to memory controller 220 in accordance with any suitable communications protocol.

For one embodiment, output circuitry 248 stores the accessed bits for the received read request in output buffer 249. Output buffer 249 may have any suitable size. For one embodiment, output buffer 249 is sized to store a cache line.

Output circuitry 248 for one embodiment outputs the bits stored in output buffer 249 over data bus 236 to memory controller 220. Output circuitry 248 for one embodiment outputs the stored bits over multiple clock cycles by outputting only a portion of the stored bits for each clock cycle. Output circuitry 248 for one embodiment outputs a predetermined number of the stored bits for each clock cycle. Any suitable predetermined number may be used. For one embodiment, the predetermined number is equal to the width of data bus 236. For one embodiment where 256 bits are accessed for the received read request, output circuitry 248 for one embodiment outputs 32-bit portions of the requested program code and/or data over eight clock cycles.

Memory device 240 for one embodiment accesses and outputs only the program code and/or data that is requested by each read request and not any non-requested program code and/or data under any prediction mechanism. Memory device 240 for one embodiment accesses and outputs only a cache line requested by each cache fill line read request. By accessing and outputting only what is requested, memory device 240 helps use energy in a relatively more efficient manner as no energy is wasted on accessing and outputting non-requested program code and/or data that will not later be requested or used. Also, the performance of read requests will not become unnecessarily delayed due to the additional time required to output the non-requested program code and/or data.

For block 116, memory controller 220 receives bits output from memory device 240 for the read request and issues another prioritized read request to memory device 240 prior to or while receiving the output bits. Memory controller 220 may issue the other prioritized read request to memory device 240 in accordance with any suitable communications protocol.

For one embodiment, response control circuitry 226 receives bits output from memory device 240 for each read request and stores the received bits in response queue 228. For one embodiment, request control circuitry 222 issues the next prioritized read request in request queue 224 to memory device 240. For one embodiment, request control circuitry 222 issues the other prioritized read request by issuing one or more control signals over control bus 232 and by issuing address signals for the other prioritized read request over address bus 234. Request control circuitry 222 for one embodiment may issue a REQUEST signal over control bus 232 to issue the other prioritized read request to memory device 240.

Memory controller 220 for one embodiment may issue the other prioritized read request at a predetermined time relative to receiving output bits from memory device 240. For one embodiment, response control circuitry 226 may signal request control circuitry 222 when the output bits for a prior read request are first received. Request control circuitry 222 may then issue the other prioritized read request upon receipt of such a signal or relative to receipt of such a signal.

Memory controller 220 for another embodiment may issue the other prioritized read request after a predetermined number of clock cycles following the issuance of the just prior read request in anticipation that memory device 240 will access and start outputting bits for the just prior read request after a predetermined number of clock cycles following issuance of each read request. Memory controller 220 may issue the other prioritized read request after any suitable predetermined number of clock cycles following the issuance of the just prior read request. For one embodiment, memory controller 220 issues the other prioritized read request following the same number of clock cycles as used to output the requested program code and/or data for the just prior read request.

For one embodiment where the other read request was issued by processor 202, 204, or 206 with a virtual address, request control circuitry 222 of memory controller 220 may convert the virtual address to a real address prior to or in issuing the other read request to memory device 240.

For block 118, memory device 240 receives the other read request. For one embodiment, access circuitry 242 receives the other read request and stores the address for the other read request in address buffer 243.

For one embodiment where address buffer 243 is sized to store more than one address, access circuitry 242 may receive the other read request and store the address for the other read request in address buffer 243 while accessing the bits of the program code and/or data requested at an address currently stored in address buffer 243.

For block 120, memory device 240 accesses the bits of the program code and/or data requested by the other read request while outputting bits for the prior read request. For one embodiment, access circuitry 242 accesses in memory 246 the requested bits at the address stored in address buffer 243 for the other read request. For one embodiment where memory 246 comprises flash memory, for example, access circuitry 242 senses the requested bits to access them.

For one embodiment where address buffer 243 is sized to store more than one address, access circuitry 242 may access the bits of the program code and/or data requested by the other read request after the bits for the prior read request have been accessed. Access circuitry 242 for one embodiment queues read request addresses in address buffer 242 in their order of receipt and controls access to the bits of the program code and/or data at each address in accordance with their queued order.

Memory device 240 for one embodiment accesses a predetermined number of bits in memory 246 at the address stored in address buffer 243 for the other read request. For one embodiment, the predetermined number of bits is equal in number to that for a cache line in cache memory 203, 205, and 207.

For block 122, memory device 240 outputs the accessed bits for the other read request to memory controller 220. Memory device 240 may output the accessed bits to memory controller 220 in accordance with any suitable communications protocol.

For one embodiment, output circuitry 248 stores the accessed bits for the other read request in output buffer 249. Output circuitry 248 for one embodiment stores the accessed bits for the other read request in output buffer 249 after all bits for the prior read request have been output. For another embodiment, output circuitry 248 may store accessed bits for the other read request in output buffer 249 while output buffer 249 outputs bits for the prior read request. Output circuitry 248 may, for example, store such accessed bits in output buffer 249 over bits already output for the prior read request. For one embodiment where output buffer 249 is sized to store accessed bits for multiple read requests, output circuitry 248 may store the accessed bits for the other read request in output buffer 249 in locations distinct from those for the bits for the prior read request.

Output circuitry 248 for one embodiment outputs the bits stored in output buffer 249 over data bus 236 to memory controller 220. Output circuitry 248 for one embodiment outputs the stored bits over multiple clock cycles by outputting only a portion of the stored bits for each clock cycle. Output circuitry 248 for one embodiment outputs a predetermined number of the stored bits for each clock cycle. Any suitable predetermined number may be used. For one embodiment, the predetermined number is equal to the width of data bus 236. For one embodiment where 256 bits are accessed for the other read request, output circuitry 248 for one embodiment outputs 32-bit portions of the requested program code and/or data over eight clock cycles.

Memory device 240 for one embodiment accesses and outputs only the program code and/or data that is requested by each read request and not any non-requested program code and/or data under any prediction mechanism. Memory device 240 for one embodiment accesses and outputs only a cache line requested by each cache fill line read request. By accessing and outputting only what is requested, memory device 240 helps use energy in a relatively more efficient manner as no energy is wasted on accessing and outputting non-requested program code and/or data that will not later be requested or used. Also, the performance of read requests will not become unnecessarily delayed due to the additional time required to output the non-requested program code and/or data.

By issuing the other read request to memory device 240 prior to or while memory device 240 outputs bits for the prior read request and by accessing the bits of the program code and/or data requested by the other read request while outputting bits for the prior read request, the performance of multiple read requests is pipelined. The access latency for each read request subsequent to the first read request may be partially or wholly hidden as memory device 240 may output requested bits for each read request relatively sooner following the output of requested bits for a prior read request. Memory device 240 may therefore perform multiple read requests with relatively increased data throughput. Memory device 240 for one embodiment may output the requested program code and/or data for multiple random read requests as an uninterrupted output stream as long as the time to access the bits for each read request is shorter than the time to output the bits for a just prior read request and as long as each read request is issued such that the bits for the read request may be accessed prior to the output of all of the bits for a just prior read request. This is so regardless of whether the requested program code and/or data for the multiple read requests are stored sequentially in memory 246.

Figure 3:
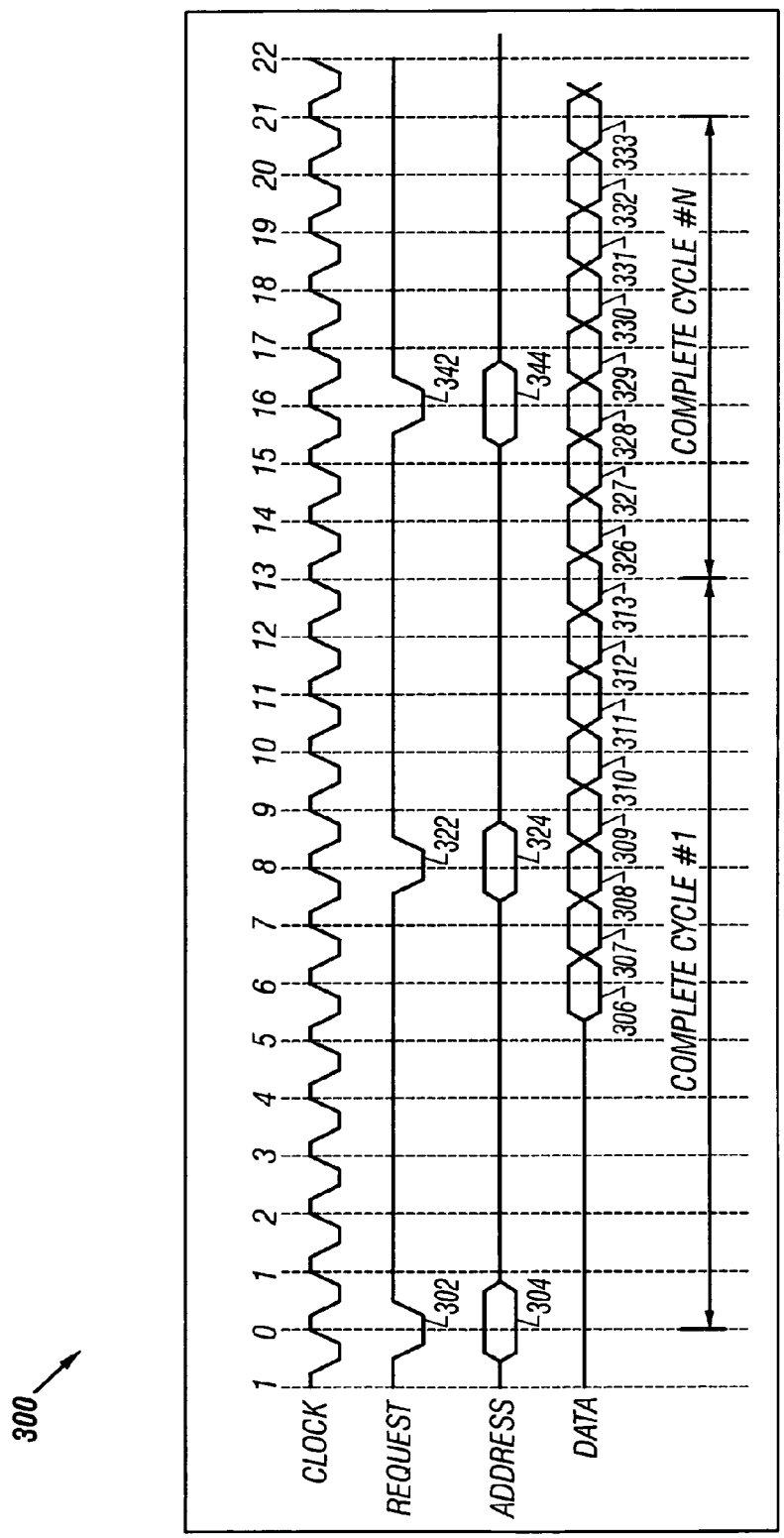
FIG. 3 illustrates, for one embodiment, a timing diagram for pipelining multiple read requests.

FIG. 3 illustrates, for one embodiment, a timing diagram 300 for pipelining multiple read requests. Timing diagram 300 comprises timelines for a CLOCK signal, a REQUEST signal, ADDRESS signals, and DATA signals. For one embodiment, memory controller 220 issues the CLOCK and REQUEST signals over control bus 232. The ADDRESS signals correspond to signals transmitted by memory controller 220 to memory device 240 over address bus 234. The DATA signals correspond to signals transmitted by memory device 240 to memory controller 220 over data bus 236. The REQUEST, ADDRESS, and DATA signals may each be generated on the rising or falling edge of a CLOCK signal. The REQUEST signal for one embodiment, as illustrated in FIG. 3, is an active low signal. For another embodiment, the REQUEST signal may be an active high signal.

As illustrated in FIG. 3, memory controller 220 outputs an active REQUEST signal 302 and address signals 304 for a first read request to memory device 240 at a clock cycle 0. Memory device 240 accesses a predetermined number of bits at the address designated by address signals 304 during clock cycles 1–5 and outputs the accessed bits as data signal sets 306, 307, 308, 309, 310, 311, 312, and 313 at respective clock cycles 6–13. For one embodiment, data signal sets 306–313 for each respective clock cycle 6–13 are each 32 bits in size. The requested program code and/or data is therefore 256 bits in size.

At clock cycle 8, memory controller 220 outputs to memory device 240 another active REQUEST signal 322 and address signals 324 for another read request while memory device 240 is outputting data signal sets 306–313 for the first read request. Memory device 240 accesses a predetermined number of bits at the address designated by address signals 324 during clock cycles 9–13 and outputs the accessed bits as data signal sets 326, 327, 328, 329, 330, 331, 332, and 333 at respective clock cycles 14–21. Because the other read request was issued six cycles prior to the first clock cycle following the output of data signal sets 306–313 and because the access latency for the other read request is six clock cycles, the access latency for the other read request is hidden as memory device 240 outputs data signal sets 326–333 immediately following the output of data signal sets 306–313.

Memory controller 220 and memory device 240 for one embodiment may be optimized to perform read requests at relatively higher clock frequencies, for example, by restricting read requests to program code and/or data of only one predetermined size, such as for a cache line fill for example, and by restricting control over how and when requested program code and/or data is output from memory device 240 to memory controller 220.

For block 124 of FIG. 1, memory controller 220 outputs the bits received from memory device 240 for any prior read requests to the requesting processor 202, 204, or 206. Memory controller 220 for one embodiment identifies the requesting processor 202, 204, or 206 based on the identity of the originating processor 202, 204, or 206 as specified in each read request. Memory controller 220 may output the requested bits for each read request to the requesting processor 202, 204, or 206 in any suitable order and in accordance with any suitable communications protocol.

For one embodiment, response control circuitry 226 outputs the requested bits for each read request from response queue 228. Response control circuitry 226 for one embodiment may communicate with request control circuitry 222 to identify the requesting processor 202, 204, or 206 for any requested program code and/or data received from memory device 240. Response control circuitry 226 for one embodiment attempts to output the requested bits for read requests in the same order in which each read request was issued to memory device 240. If memory controller 220 is unable to output the bits requested by a processor 202, 204, or 206, for example, because the requesting processor 202, 204, or 206 is busy, memory controller 220 for one embodiment may attempt to output the bits requested by another processor 202, 204, or 206 and later again attempt to output the bits requested by the busy processor 202, 204, or 206.

For block 126, memory controller 220 determines whether any more read requests are to be issued to memory device 240. For one embodiment, request control circuitry 222 determines whether request queue 224 is storing any read requests to be issued to memory device 240.

If memory controller 220 determines another read request is to be issued to memory device 240, memory controller 220 for block 116 issues another prioritized read request to memory device 240 prior to or while receiving the bits output from memory device 240 for block 122. With reference to timing diagram 300 of FIG. 3, memory controller 220 for one embodiment outputs an active REQUEST signal 342 and address signals 344 for the other read request to memory device 240 at clock cycle 16.

Memory device 240 for block 118 receives the currently issued read request, for block 120 accesses the requested bits for the current read request while outputting bits for the just prior read request, and for block 122 outputs the accessed bits for the current read request. Memory controller 220 for block 124 outputs the bits received from memory device 240 for any prior read requests to the requesting processor 202, 204, or 206 and for block 126 determines whether any more read requests are to be issued to memory device 240. Memory controller 220 and memory device 240 continue to function in accordance with blocks 116, 118, 120, 122, 124, and 126 until memory controller 220 determines for block 126 that no other read request is to be issued to memory device 240.

If memory controller 220 determines for block 126 that no other read request is to be issued to memory device 240, memory controller 220 for block 128 receives the bits output from memory device 240 for block 122 and outputs the received output bits for the current read request to the requesting processor 202, 204, or 206.

Processors 202, 204, and/or 206, memory controller 220, and/or memory device 240 may function in accordance with any block 102–128 at any suitable time relative to the functioning of processors 202, 204, and/or 206, memory controller 220, and/or memory device 240 for any other block 102–128. As one example, processors 202, 204, and/or 206 may issue read requests to memory controller 220, and memory controller 220 may receive any issued read requests at any suitable time. As another example, memory controller 220 may output the bits for any read request to the requesting processor 202, 204, or 206 at any suitable time.

Other Exemplary Computer Systems

Figure 4:
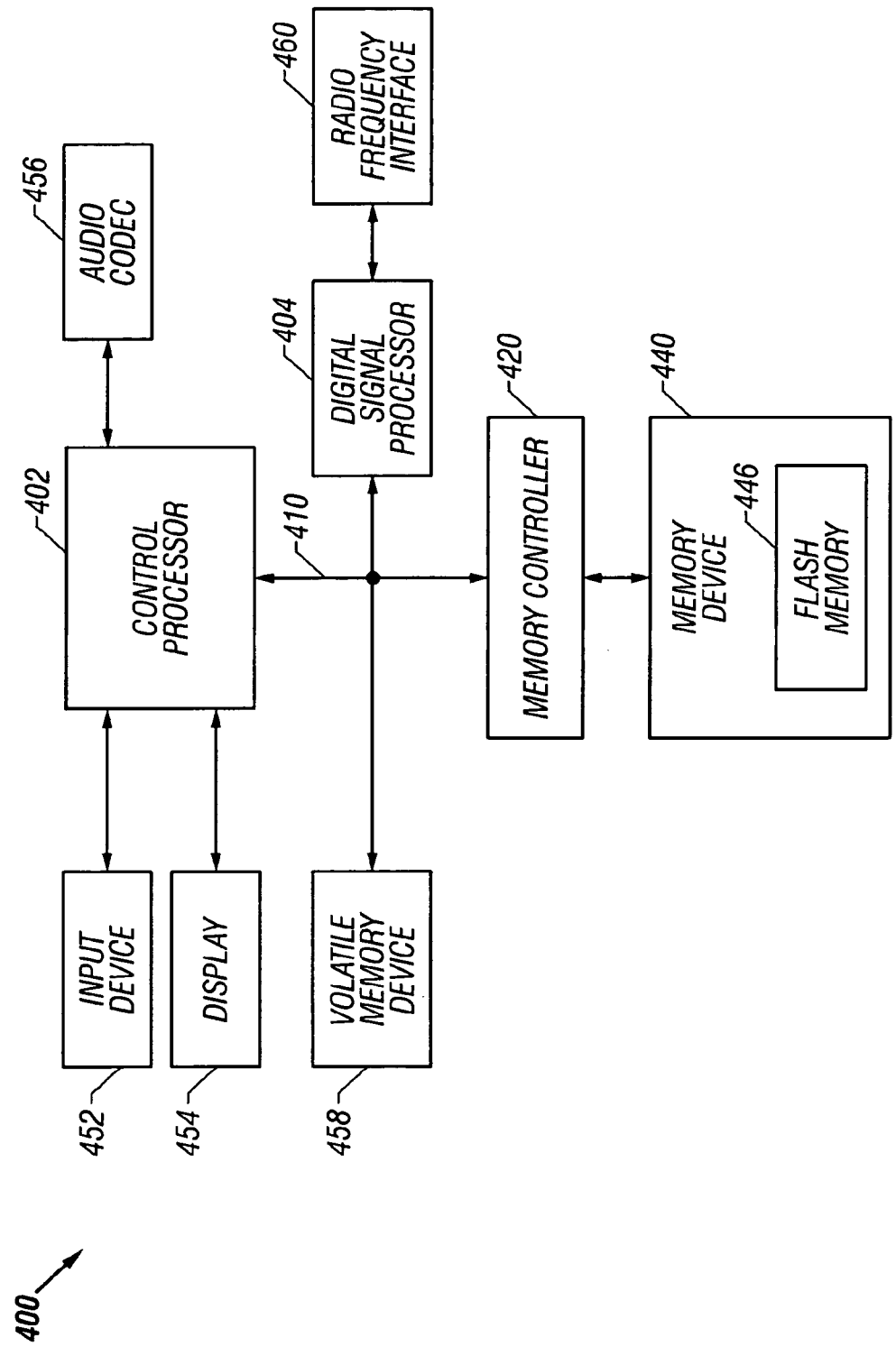
FIG. 4 illustrates another exemplary computer system having a memory controller to control the performance of multiple read requests by a memory device for multiple hosts.

FIG. 4 illustrates an exemplary computer system 400 comprising a control processor 402, a digital signal processor (DSP) 404, a memory controller 420, a memory device 440 comprising flash memory 446, an input device 452, a display 454, an audio coder/decoder (codec) 456, a volatile memory device 458, and a radio frequency (RF) interface 460. Computer system 400 may be used for any suitable handheld and/or wireless device such as, for example, a cellular telephone or a personal digital assistant (PDA). Computer system 400 for other embodiments may comprise any other suitable combination of any suitable components.

Input device 452, display 454, and audio codec 456 are each coupled to control processor 402. Input device 452 may comprise any suitable input device such as, for example, a keyboard, a voice recognition device, and/or a pen tablet for example. Audio codec 456 may be used, for example, to couple a microphone, speakers, and/or headphones, for example, to control processor 402. Volatile memory device 458 is coupled to control processor 402 and to DSP 404 by a bus 410 and serves as a working memory for control processor 402 and/or DSP 404. DSP 404 is coupled to control processor 402 by bus 410 and to RF interface 460. RF interface 460 transmits and receives RF signals for computer system 400. DSP 404 performs suitable digital signal processing techniques for signals received by RF interface 460 and for signals to be transmitted through RF interface 460.

Memory controller 420 is coupled to control processor 402 and to DSP 404 by bus 410. Control processor 402 and DSP 404 may each issue read requests to memory controller 420 over bus 410 to retrieve program code and/or data, for example, stored in flash memory 446 of memory device 440. Flash memory 446 may be used to store any suitable program code and/or data, for example, for computer system 400. Flash memory 446 may be used, for example, to store any suitable firmware, such as operating system software for example, for execution by control processor 402 and/or DSP 404. Flash memory 446 may also be used, for example, to store data, such as phone directory information for example, for computer system 400. Although illustrated as comprising flash memory 446, memory device 440 may comprise any suitable type of memory. Memory controller 420 controls the performance of read requests by memory device 440 similarly as memory controller 220 of FIG. 2 controls the performance of read requests by memory device 240. Memory device 440 accesses and outputs bits for read requests similarly as memory device 240 of FIG. 2. For one embodiment where computer system 400 is powered using a battery, for example, the use of memory controller 420 and memory device 440 helps prolong battery life as memory controller 420 and memory device 440 use energy in a relatively more efficient manner in accessing and outputting requested program code and/or data for multiple read requests.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
receiving multiple read requests from a first processor and a second processor;
prioritizing the multiple read requests;
issuing a first prioritized read request to a non-volatile memory device;
subsequent to issuing the first prioritized read request, issuing a second prioritized read request to the non-volatile memory device prior to receiving bits from the non-volatile memory device for the first read request, wherein the second prioritized read request can access all memory locations in the non-volatile memory device;
receiving a first set of bits from the non-volatile memory device corresponding to the first read request and a second set of bits corresponding to the second read request, as an uninterrupted stream of data; and
transmitting the bits corresponding to the first read request and the second read request to the first processor and the second processor based upon the determined priority.

2. The method of claim 1, wherein the first read request requests a predetermined number of bits.

3. The method of claim 1, wherein the first read request is a cache line fill read request.

4. The method of claim 1, comprising accessing bits in the non-volatile memory device for the second read request while outputting bits from the non-volatile memory device for the first read request.

5. The method of claim 1, comprising sensing bits in the non-volatile memory for the second read request while outputting bits from the non-volatile memory device for the first read request.

6. An apparatus comprising a memory controller to:
prioritize multiple read requests received from a first processor and a second processor in an order for issuance;
issue a first prioritized read request to a non-volatile memory device;
subsequent to issuing the first prioritized read request, issue a second prioritized read request to the non-volatile memory device prior to receiving bits from the non-volatile memory device for the first read request; and
receive a first set of bits from the non-volatile memory device corresponding to the first read request and a second set of bits corresponding to the second read request, wherein the first set of bits and the second set of bits are received as an uninterrupted stream of data;
wherein the second prioritized read request can access all memory locations in the non-volatile memory device.

7. The apparatus of claim 6, wherein the first read request requests a predetermined number of bits.

8. The apparatus of claim 6, wherein the first read request is a cache line fill read request.

9. The apparatus of claim 6, wherein the memory controller comprises request control circuitry comprising a request queue, the request control circuitry to prioritize multiple read requests, to store prioritized read requests in the request queue, and to issue prioritized read requests.

10. The apparatus of claim 6, the memory controller to transmit the bits corresponding to the first read request and the second read request to the first processor and the second processor based upon the determined priority.

11. The apparatus of claim 10, wherein the memory controller comprises response control circuitry comprising a response queue, the response control circuitry to store bits received from the non-volatile memory device for the second read request in the response queue and to output stored bits for the second read request to the host that originated the second read request.

12. The apparatus of claim 6, further comprising the non-volatile memory device to receive read requests issued by the memory controller, to access bits for received read requests, and to output accessed bits to the memory controller for received read requests, the non-volatile memory device to access bits for the first read request while outputting accessed bits to the memory controller for the second read request.

13. The apparatus of claim 12, wherein the non-volatile memory device comprises:
memory;
access circuitry to receive read requests issued by the memory controller and to access bits in the memory for received read requests; and
output circuitry to output accessed bits for received read requests to the memory controller.

14. A computer system comprising:
a first processor to issue read requests;
a second processor to issue read requests;
a memory controller to:
receive the multiple read requests from the first and second processors;
prioritize multiple read requests in an order for issuance;
issue a first prioritized read request to a non-volatile memory device;
subsequent to issuing the first prioritized read request, issue a second prioritized read request to the non-volatile memory device prior to receiving bits from the non-volatile memory device for the first read request;
receive bits for issued read requests to the non-volatile memory device; and
output received bits for the issued read requests to the first and second processors based upon the determined priority, wherein the second prioritized read request can access all memory locations in the non-volatile memory device; and
the non-volatile memory device to receive read requests issued by the memory controller, to access bits for received read requests, and to transmit a first set of bits to the memory controller corresponding to the first read request and a second set of bits corresponding to the second read request, wherein the first set of bits and the second set of bits are received as an uninterrupted stream of data.

15. The computer system of claim 14, wherein the first read request requests a predetermined number of bits.

16. The computer system of claim 14, wherein the first processor has a cache memory and the first read request is a cache line fill read request.

17. The computer system of claim 14, wherein the memory controller comprises request control circuitry comprising a request queue, the request control circuitry to prioritize multiple read requests, to store prioritized read requests in the request queue, and to issue prioritized read requests.

18. The computer system of claim 14, wherein the memory controller comprises response control circuitry comprising a response queue, the response control circuitry to store bits received from the non-volatile memory device for the second read request in the response queue and to output stored bits for the second read request to a processor that originated the second read request.

19. The computer system of claim 14, wherein the non-volatile memory device comprises:
memory;
access circuitry to receive read requests issued by the memory controller and to access bits in the memory for received read requests; and
output circuitry to output accessed bits for received read requests to the memory controller.

20. The computer system of claim 14, wherein the first processor is a control processor and the second processor is a digital signal processor.

21. The computer system of claim 14, wherein the non-volatile memory device accesses for the first read request only bits that are requested by the first read request.

22. A system comprising:
a radio frequency interface;
a digital signal processor;
a control processor;
a memory controller to;
receive multiple read requests from the digital signal processor and the control processor;
prioritize multiple read requests in an order for issuance;
issue a first prioritized read request prior to a memory device;
subsequent to issuing the first prioritized read request; issue a second prioritized read request to the memory device prior to or while receiving bits from the memory device for the first read request;
receive bits for issued read requests; and
output received bits for issued read requests to the digital signal processor and the control processor based upon the priority, wherein the second prioritized read request can access all memory locations in the non-volatile memory device; and
the memory device to receive read requests issued by the memory controller, to access bits for received read requests, and to transmit a first set of bits to the memory controller corresponding to the first read request and a second set of bits corresponding to the second read request, wherein the first set of bits and the second set of bits are received as an uninterrupted stream of data.

23. The system of claim 22, wherein the first read request requests a predetermined number of bits.

24. The system of claim 22, wherein the first read request is a cache line fill read request.

25. The system of claim 22, wherein the memory controller comprises request control circuitry comprising a request queue, the request control circuitry to prioritize multiple read requests, to store prioritized read requests in the request queue, and to issue prioritized read requests.

26. The system of claim 22, wherein the memory controller comprises response control circuitry comprising a response queue, the response control circuitry to store bits received from the non-volatile memory device for the second read request in the response queue and to output stored bits for the second read request to a processor that originated the second read request.

27. The system of claim 22, wherein the non-volatile memory device comprises:

memory;

access circuitry to receive read requests issued by the memory controller and to access bits in the memory for received read requests; and output circuitry to output accessed bits for received read requests to the memory controller.

28. The system of claim 22, wherein the non-volatile memory device accesses for the first read request only bits that are requested by the first read request.

* * * * *